Dec. 25, 1951　　　　C. L. JOHNSON　　　　2,580,176
ADJUSTABLE EMPENNAGE
Filed April 18, 1947
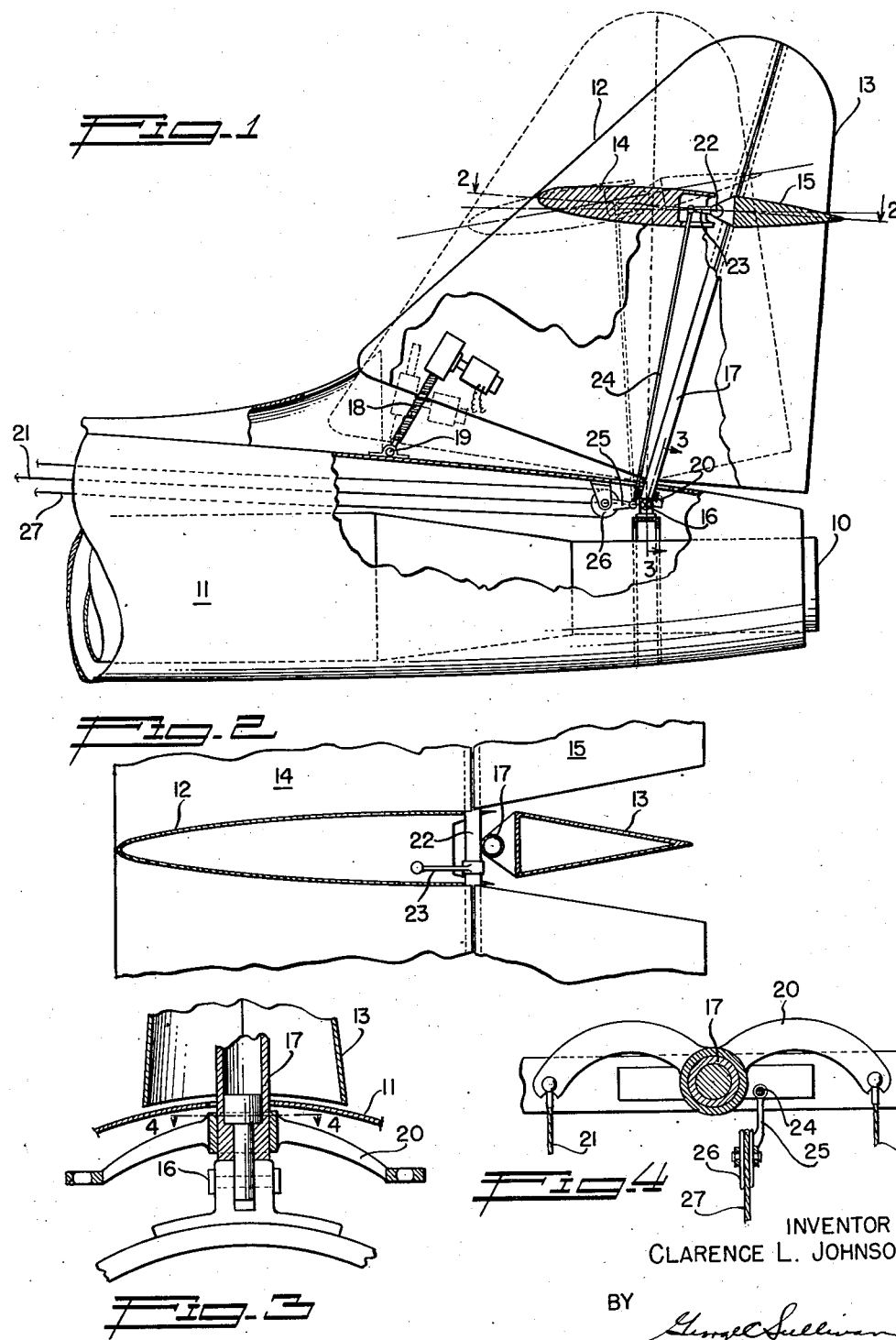
INVENTOR
CLARENCE L. JOHNSON
BY
Agent

Patented Dec. 25, 1951

2,580,176

UNITED STATES PATENT OFFICE 2,580,176

ADJUSTABLE EMPENNAGE

Clarence L. Johnson, Encino, Calif., assignor to
Lockheed Aircraft Corporation, Burbank, Calif.

Application April 18, 1947, Serial No. 742,427

4 Claims. (Cl. 244—87)

This invention relates to an adjustable airplane empennage wherein the horizontal surface is fixed securely to the vertical surface and the combination of the two surfaces can be adjusted by tilting the vertical surface forward or aft, thus producing a change in angle of attack of the horizontal surface.

In the design of airplanes intended to approach or enter the transonic speed range, the control of the pitching moment is important. Large changes in the pitching moment coefficient indicate an aerodynamic center or neutral point variation with speed which makes it difficult to obtain adequate stability throughout the speed range without encountering excessive stability in certain speed ranges. When shock stall occurs on the wing, causing such a change in the moment characteristics, marked changes in longitudinal stability, control and horizontal tail loads may be expected.

In accordance with the known theory of either straight or swept-back wings, in the transonic range, i. e. at Mach numbers approaching unity (Mach numbers from .75 to 1.0 approximately), a radical change of characteristics has been encountered. The angle of attack for zero lift for cambered wings shifts to a more positive angle, and as a result when passing through this range the wing must have its angle of attack increased in order to support the weight. These findings as to wings apply equally to the horizontal stabilizer which must have its angle of attack increased to maintain longitudinal control and trim.

At lower Mach numbers, or normal cruising speeds, sweep-back has disadvantages adversely affecting the stability and control in the low speed range. Accordingly, it is desirable to utilize a swept-back fin arrangement only at high Mach numbers, and to this end it is an object of this invention to angularily adjust the vertical stabilizer or fin surface for improved performance at high Mach numbers while retaining the advantages of a more vertical position at lower speeds.

It is also an object of this invention to provide an improved and adjustable airplane empennage wherein the horizontal stabilizer is carried by the vertical stabilizer above the down wash from the main wing, and is simultaneously movable with and its angle of incidence decreased as the vertical tail or fin is given a swept forward position for operation at low speeds.

It is a further object of this invention to provide simplified operating controls for the rudder and elevators associated with an adjustable empennage of the type described that will not be affected by the rearward tilting of the vertical stabilizer or fin.

It is another object of this invention to provide an improved elevator and stabilizer control providing the pilot with a power operated stabilizer adjustment for possible use in the event the elevators alone are ineffective or inoperative to produce recovery from a dive at high Mach numbers.

Other objects and features of the invention will be readily understood from the following detailed description of a typical preferred form of the invention wherein reference will be made to the accompanying drawings in which:

Figure 1 is a side view of an airplane empennage embodying the features of this invention;

Figure 2 is a fragmentary section on the line 2—2 of Figure 1 showing the rudder and elevator pivots;

Figure 3 is an enlarged detail on the line 3—3 of Figure 1 showing one form of control linkages at the base of the rudder pivot; and Figure 4 is a section on the line 4—4 of Figure 3.

As shown on the drawings, I have chosen to illustrate my invention as applied to a jet propelled airplane wherein a jet tube 10 is disposed centrally within the tail of a fuselage 11, an empennage being mounted thereon comprising a vertical stabilizer 12, hereinafter called the fin, for convenience, with a trailing edge rudder 13, a horizontal stabilizer 14, having trailing edge elevators 15, being mounted on the fin 12 at a distance above the fuselage in order to position the horizontal stabilizer and elevators above the down-wash from the airplane wing, not shown.

The horizontal stabilizer 14 is rigidly mounted on the fin 12. The latter is so mounted relative to the fuselage that it can be tilted forward to the dotted line position of Figure 1, the horizontal stabilizer being thereby given an increased negative angle of incidence at the same time as the fin is given a swept forward position. While a pivot point 16 for the fin could be located near the leading edge of the stabilizer, I have chosen to illustrate it as associated with the rear spar of the fin and the torque tube or rudder pivot 17, in order to simplify the rudder and elevator control connections. With the pivot point 16 so chosen I provide a motor driven jack 18, similar to a cowl flap actuator, at the alternative pivot point 19, extension of the jack tilting the fin back, as shown in the solid line position, and retraction thereof moving the fin to its erect or dotted line position. It is to be understood that any intermediate position can be used, depending on the aerodynamic trim conditions required under the operating conditions encountered at any given instant.

The rudder 13 is shown as carried by and operated by the torque tube 17, which is controlled by a yoke 20 and cables 21 leading to the usual rudder pedals at the pilot's location. The elevators 15 have a connecting torque tube 22 with a lever 23 operated by a push pull rod 24 and a second lever 25 on a pulley 26 operated by a cable 27 connected to the pilot's control. The two levers and push rod are so located that changes in the tilt of the stabilizers does not materially change the elevator angle relative to the stabilizer. If desired, the relative lever lengths and locations can be varied to give either a servo or anti-servo effect to the elevators based on a fixed pilot held stick position in the cockpit.

The operation of adjusting the fin and stabilizer is under the control of the pilot, to compensate for variations in the lift of the main wing at different speeds, as well as changes in longitudinal trim as the transonic speed range is approached, wherein the aerodynamic center of pressure moves back to increase the necessary correcting force derived from the stabilizer and elevator. It will be evident that movement of the fin and stabilizer toward the full line position increases the lever arm of the lifting forces of the stabilizer and elevator relative to the wing and center of gravity of the airplane, thus compounding the effect of the increased angle of attack thereof.

In a normally stable airplane the requirement for trimming the unbalanced forces for various speeds of flight is such that the horizontal tail incidence changes in a positive direction as the speed increases. Thus, at low speeds the horizontal tail should have a large negative angle which in this case would be obtained with the fin in the forward swept position. Conversely, at high speeds the horizontal tail incidence to trim the airplane will be neutral or slightly positive. In this case the fin will be adjusted to the aft swept position which is the desirable position for the minimum drag at high speeds. The fact that the entire horizontal surface can be adjusted by the pilot increases the capability of the pilot to control the airplane if adverse diving or stalling moments are experienced in transonic or supersonic flight. The control of the elevators alone may not be sufficient to counteract these moments and the control surface hinge moment may be larger than the pilot can produce. Thus the power operation of the stabilizer permits control even though the elevators are relatively useless.

Having thus described my invention and the present preferred embodiments thereon, I desire to emphasize the fact that many modifications may be resorted to in a manner limited only by a just interpretation of the following claims.

I claim:

1. In an airplane, a fuselage, an empennage comprising a vertical fin, means pivotally mounting said fin to the fuselage for angular movements in the vertical longitudinal plane of the fuselage, means connecting the fin and the fuselage in spaced relation to said pivotally mounting means and operable to adjust the angular position of said fin at the will of the pilot, and horizontal stabilizers fixedly mounted on said fin in substantially spaced relationship to said pivotally mounting means whereby the angle of incidence and lever arm relative to the center of gravity of the airplane of said stabilizers will be varied by the angular adjustment of said fin.

2. In an airplane, a fuselage, an empennage comprising a vertical fin, means pivotally mounting said fin to the fuselage for angular movements in the vertical longitudinal plane of the fuselage, means connecting the fin and the fuselage in spaced relation to said pivotally mounting means and operable to adjust the angular position of said fin at the will of the pilot, horizontal stabilizers fixedly mounted on said fin at an elevated position thereon remote from the fin pivot mounting means whereby the angle of incidence and lever arm relative to the center of gravity of the airplane of said stabilizers will be varied by the angular adjustment of said fin, elevators pivoted to the trailing edges of said stabilizers, and control means to operate said elevators independently of the angular adjustment of the fin and associated stabilizers.

3. In an airplane, a fuselage, an empennage comprising a vertical stabilizing fin, a mounting therefor arranged to permit angular adjustments of said fin in the plane of the fin, means connected between the fin and the fuselage in spaced relation to said mounting and operable to adjust the angular position of said fin in flight at the will of the pilot, horizontal stabilizers fixedly associated with said fin in spaced relationship to said mounting for angular and longitudinal adjustment simultaneously therewith, elevators pivoted to the trailing edges of said stabilizers, and control means to operate said elevators independently of the angular adjustment of the fin and associated stabilizers.

4. In an airplane, a fuselage, an empennage comprising a vertical fin, means pivotally mounting said fin to the fuselage for angular movements in the vertical longitudinal plane of the fuselage, means connecting the fin and the fuselage in spaced relation to said pivotally mounting means and operable to adjust the angular position of said fin at the will of the pilot, horizontal stabilizers fixedly mounted on said fin in vertically spaced relation to the fin mounting whereby the angle of incidence and lever arm relative to the center of gravity of the airplane of said stabilizers will be varied by the angular adjustment of said fin, elevators pivoted to the trailing edges of said stabilizers, and linkage offset relative to the fin mounting to vary the angle of said elevators in response to angular adjustment of the fin and associated stabilizers.

CLARENCE L. JOHNSON.

REFERENCES CITED

The following references are of record in the file of this patent:

UNITED STATES PATENTS

| Number | Name | Date |
| --- | --- | --- |
| 1,642,686 | Mitchell | Sept. 20, 1927 |
| 1,650,113 | Clark | Nov. 22, 1927 |

FOREIGN PATENTS

| Number | Country | Date |
| --- | --- | --- |
| 129,687 | Great Britain | July 24, 1919 |